United States Patent [19]

Heinrich et al.

[11] 4,172,792
[45] Oct. 30, 1979

[54] MOVABLE APPARATUS FOR REMOVAL OF FILTER PLATES FROM A FILTER PRESS

[76] Inventors: Hans J. Heinrich, Wilhelmshoeher Str. 129, 5828 Ennepetal; Karl A. Rademacher, Hatzfelder Str. 33; Helmut Strohn, Helmutstr. 12, both of 5600 Wuppertal 2, all of Fed. Rep. of Germany

[21] Appl. No.: 909,772

[22] Filed: May 26, 1978

[30] Foreign Application Priority Data

May 31, 1977 [DE] Fed. Rep. of Germany ....... 2724472

[51] Int. Cl.$^2$ ............................................ B01D 25/12
[52] U.S. Cl. .................................................... 210/230
[58] Field of Search ......................................... 210/230

[56] References Cited

U.S. PATENT DOCUMENTS

| 3,754,657 | 8/1973 | Harp | 210/230 |
| 4,102,788 | 7/1978 | Broad | 210/230 |

FOREIGN PATENT DOCUMENTS 1810112  6/1970  Fed. Rep. of Germany ........... 210/230

*Primary Examiner*—John Adee
*Attorney, Agent, or Firm*—Abraham A. Saffitz

[57] ABSTRACT

The invention relates to a movable apparatus for removal of filter plates from a filter press, these plates resting on two horizontal guide carriers. The apparatus has a carriage, movable on the guide carriers, which has a driving apparatus for a driver means, in order to always pull off the outside filter plate from a pack of filter plates, and a bolt for holding back the remaining filter plates in the pack. The driver means and bolt are arranged in such manner that the driver means and bolt are movable up and down between a lower engaging position aligned with stops on the sides of the filter plates and an upper dis-engaging position away from such stops.

6 Claims, 7 Drawing Figures

MOVABLE APPARATUS FOR REMOVAL OF FILTER PLATES FROM A FILTER PRESS

CROSS REFERENCE TO RELATED APPLICATIONS

This application is based, for priority under 35 USC 119, on West German patent application No. P 27 24 472.0 filed May 31, 1977.

BACKGROUND OF THE INVENTION

1. Field of the Invention

This invention lies in the field of movable apparatus for removing a selected outer plate from a pack or stack of plates in a filter press of the type having horizontal guide carriers for supporting the filter plates in such stack.

2. Description of the Prior Art

In the West German Pat. No. 18 10 112 there is disclosed a movable apparatus for the filter plates of a filter press which has a carriage, movable on guide girders disposed above the filter plates, which is provided with a driver for shifting of the filter plates, movable reciprocally by means of a first piston-cylinder arrangement cooperating with a bolt for holding back the remaining pack of filter plates. The driver is controllable in an up and down direction by means of a second piston cylinder arrangement connected thereto. This known, movable apparatus, because of the two piston cylinder arrangements provided therein, is relatively expensive and requires a costly control arrangement in order to assure an operational coordination of the separately directed movement of the driver and bolt.

OBJECT OF THE INVENTION

The invention is based on fulfilling the object of creating a movable apparatus of the movable carriage type as in the cited German Patent at more reasonable cost than the prior art apparatus which, even when designed for fully automatic operation, will need only a minimum of additional control arrangements.

The solution to this problem has been achieved by the present invention.

SUMMARY OF THE INVENTION

According to this invention only one driving apparatus, apart from the moving motor of the carriage, has been provided on the carriage which controls the movement of the driver means as well as the movement of the bolt, whereby the operational cooperation between the movement of bolt and driver means is ensured by purely mechanical coupling members so that additional electrically or pneumatically operated control arrangements for this task of coordination may be entirely omitted. As a result, a movable apparatus at a much more favorable cost has been achieved which is distinguished by a particularly high degree of functional safety and little susceptibility to trouble or failure during use.

According to a preferred embodiment of the invention a forwardly directed ratchet lever is provided which is disposed so that the horizontal arm of this lever is articulated to the sled portion of the movable carriage by means of a second side bar whereby the shifting path of the driver means on the falling lever is shorter by a distance which is about the thickness of a filter plate, this shorter distance being this thickness subtracted from the distance between the driver means and the ratcher lever projection. Due to these new and simplified mechanical means of the invention the filter plate which is being pulled off is moved along in two approximately equal steps in a direction away from the tightly packed group of filter plates formed at the other end of the filter press. After execution of this first shifting step, every filter plate is thus accessible at both main sides thereby permitting the desired filter cake ejection from the selected filter plate to be controlled. At the same time the selection, if necessary, may be accomplished by the intercession of an operating attendant.

The transfer of the filter plate, as explained above, is made to a critical free position in an intermediate location which is accessible from both sides. This intermediate stage has proven to be very advantageous in the case of filter presses which are equipped with a filter plate spraying mechanism as shown in my pending patent application Ser. No. 808,331, filed June 14, 1977. The longitudinal movability of both the filter opening mechanism and my prior filter cake washing mechanism in this intermediate stage provide an obvious savings of time, labor and energy. The movable apparatus may not only be used for the opening of the pack of filter plates for the purpose of ejecting the filter cake from the selected plate, but also for moving the end plates apart for the purpose of spraying and washing the filter plates on both sides in a particularly easy manner.

BRIEF DESCRIPTION OF THE DRAWING

The movable apparatus of the invention is described in more detail in the following paragraphs on the basis of an embodiment shown in the drawing wherein.

DESCRIPTION OF THE PREFERRED EMBODIMENT

Figure 1:
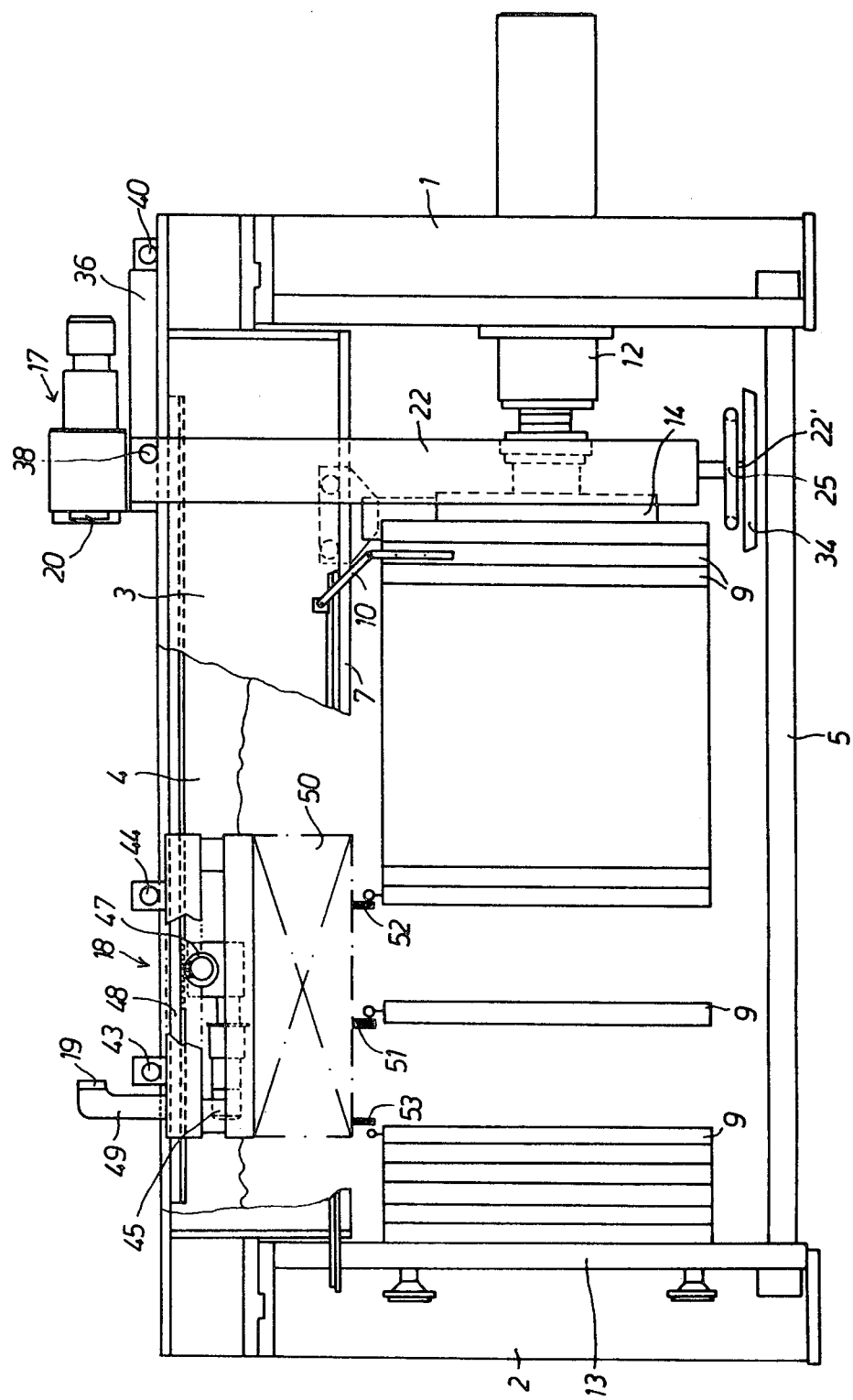
FIG. 1 shows in side view, partly broken away, a filter press with a spraying mechanism and a carriage which may be coupled with the spraying mechanism which, at the same time constitutes the movable apparatus for the filter press of the invention.

The filter press in FIG. 1 has two vertical posts 1 and 2 on which two parallel I-guide girders 3 and 4 are disposed at a distance from one another and which are connected on the bottom side by two parallel traction spars 5 and 6.

Figure 2:
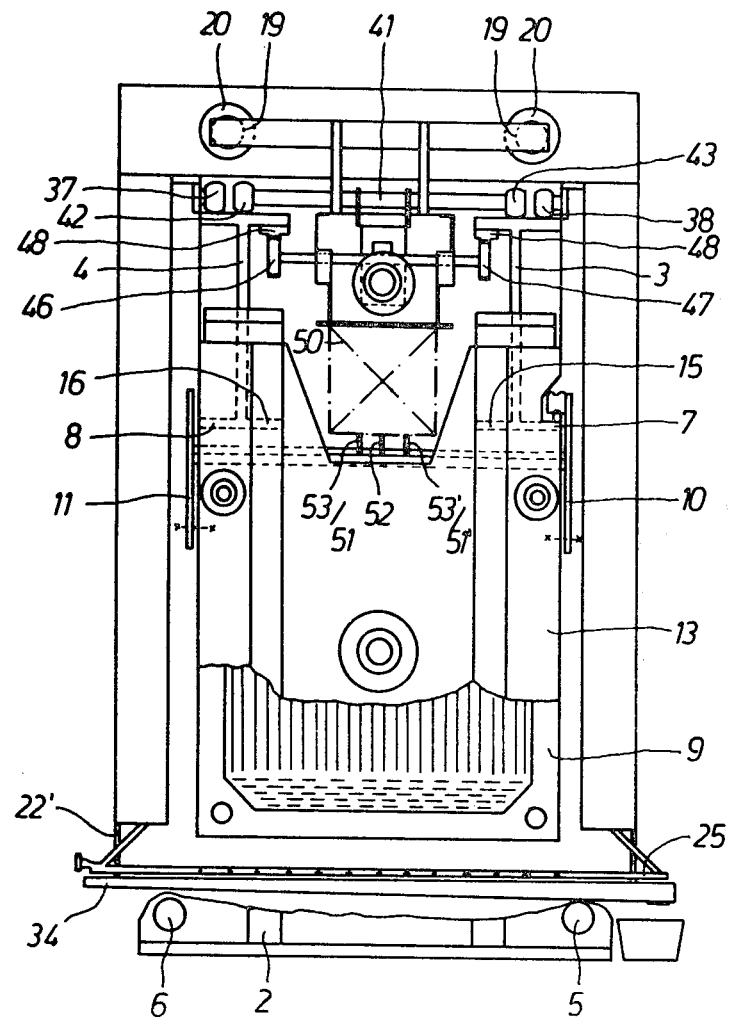
FIG. 2 is the filter press in FIG. 1 as seen from the left.

From the lower outside legs 7 and 8 of the I-guide girders 3 and 4 there are suspended a large number of filter plates 9 which may be shiftably moved by means of the angular bearing arms 10 and 11 as shown in FIGS. 1 and 2. Note that the bearing arm 10 is disposed on the front side of the filter press according to FIG. 1 and is angled toward the left. The bearing arm 11 on the other side of the filter press is angled toward the right at the same angle as arm 10 in order to thereby achieve a pendulum free suspension of the filter plates. The filter plates 9 are pushed together into a filter plate pack during press filtering by means of a known hydraulic arrangement 12 which is disposed on the side of the press whereby the fluid that is to be filtered through the press is fed through the press and then into the filtrate drawn off by the headpiece 13 disposed on the post 2. The movable headpiece 14 is mounted movably on the inside, lower flanges 15 and 16 of the I-guide girders 3 and 4 (see FIG. 1).

Figure 3:
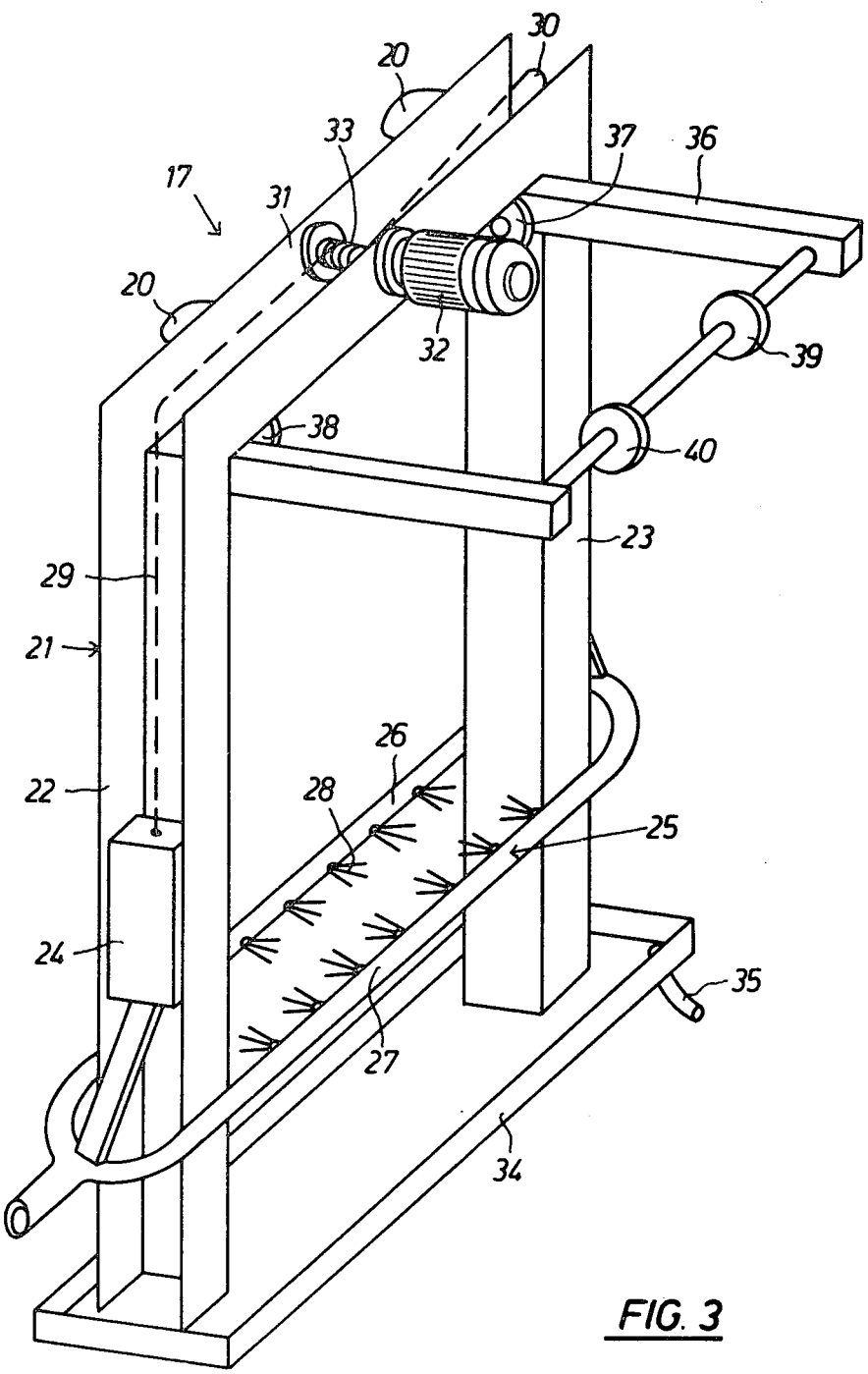
FIG. 3 is a simplified perspective presentation of the spraying mechanism.

On the upper flanges of the I-guide girders 3 and 4 a plate spraying arrangement 17 is provided and conveying carriage 18 is mounted for longitudinal movement, the carriage being equipped with the cooperating parts of electromagnetic couplings 19 and 19' and dielectromagnetic couplings 20 and 20' whereby the carriage 18 may be coupled with either of the couplings or may be uncoupled as shown in FIG. 1. The spraying arrangement 17, shown in FIG. 1, is also shown in greater detail in the schematic presentation of FIG. 3 and has a closed, rectangular bearing arm 21 which encloses the two guide girders 3 and 4 and the filter plates 9. Its lateral spars 22 and 23 have an approximately box shaped profile, open to the outside, and in these spars 22 and 23 the holders 24 are mounted for spraying pipe 25, the spraying pipe 25 being movably guidable in an upward and downward direction. The spraying pipe 25 has two branch lines 26 and 27 enclosing between them a filter plate 9, covered with filter cloths and a filter cake, the filter plate to be cleaned by washing. To clean the filter plate the lines 26 and 27 are provided with facing spray nozzles 28 so that a filter plate that is to be cleaned is sprayed simultaneously on both of its main surfaces. The holders 24 are suspended from ropes 29 and 30 which are wound on a shaft 33 in order to move the spray pipe 25 up by means of a driving motor 32 disposed on the head beam 31 of the supporting frame 21. In the case of downward movement, the ropes or cables 29 and 30 unwind under the load of holders 24, the load being developed as a counter weight as shown in FIG. 3. While the coupling parts 20' and 20 are disposed on the vertical side of the head beam 31 facing the conveying carriage 18, the driving motor 32 is attached on the vertical side of the head beam 31 facing away from the conveying carriage 18.

The underside of the supporting frame 21, as shown in FIG. 3, is developed as a catch tank 34 for catching the spray water after washing and is provided with a drain 35. While in the case of the embodiment of FIG. 1 the tank 34 is attached at the lower ends of the lateral beams 22 and 23 via narrower connecting pieces 22', the case of the schematic drawing in FIG. 3 shows the tank 34 set up directly at the lower ends of the lateral beams 22 and 23.

The spraying arrangement in FIG. 3 is provided with a four wheeled carriage which has a U-shaped frame 36, open in the direction of the closing of the pack of filter plates, on the open front ends of which the supporting frame 21 is attached. The frame 36 of the carriage carries, at its open ends, two rollers 37 and 38 running on the upper, outside flanges of the I-guide girders 3 and 4 and, on its bottom leg, two more closely disposed rollers 39 and 40 which run above the bridges of the I-guide girders 3 and 4. Instead of the two rollers 39 and 40 there may be substituted just one broad roller.

The conveying carriage 18 is disposed between the two guide girders 3 and 4 and is suspended on two running axles 41 (see FIG. 2) the rollers 42, 43 and 44 of which lie above the bridges of the I-guide girders 3 and 4. The conveying carriage is equipped with a driving motor 45 (see FIG. 1) which drives two gears 46 and 47, each of which meshes with one gear rack 48 and all of which are attached on the underside of the upper, inside flanges of the I-guide girders 3 and 4.

The conveying carriage barely projects beyond the I-guide girders at the end facing away from the spraying arrangement 17 with one arm 49 bearing the coupling parts 19' and 19 into the path of movement of the spraying arrangement 17 so that at coupling the greater part of the carriage 18 is pushed into the rearward projecting U-shaped frame 36 of the spraying arrangement. During press filtering the spraying arrangement 17 and the carriage 18 in FIG. 1 are shifted to the right to the hydraulic or pressure side of the filter press where they lie beside the pack of filter plates and are no longer in the area of the vapors rising from the filter pack.

The ability to move the carriage 18 and the spraying arrangement 17, one into the other, makes it possible, furthermore, to move the spraying arrangement 17 close to the rigid headpiece 13 of the filter press without there being a need to extend the length of the filter press. Ordinarily the attachment of washing and conveying means required for the filter plates 9 and the attachment of a hydraulic mechanism 12 would lengthen the press. This is now avoided.

The carriage 18, in combination with a coupled spraying arrangement 17, utilizes the common carriage drive means for its driving operation and for transporting a single filter plate into the spraying arrangement and, when the spraying arrangement 17 is uncoupled, for transporting the plate for filter cake ejection from the plate. The carriage 18, for this purpose, is provided, on its underside, with a control apparatus 50 which controls a driver 51 for pulling off a filter plate by a first step, a latch projection 52 for shifting on of the filter press by a second step, and a bolt 53 for holding back the filter plates remaining in the filter press pack.

In FIGS. 4 through 7 the control apparatus 50 is shown in detail in four successive positions.

The bolt 53 is seated rigidly at one end of a falling lever 54 which extends horizontally (see FIG. 4) which at its other end 55 said falling lever 54 is articulated to a vertical carrying arm 56 which is attached rigidly to the frame 57 of the carriage 18.

The driver 56 is developed on its top surface as a casing shaped part 58 and is shiftably mounted on the falling lever 54 which functions as a guide bar whereby the moving or shifting path of the driver 51 is limited on one side at 55 by means of the bolt 53 on the other side by the vertical carrying arm 56. The driver 51 is suspended by means of a side bar 59 which is directed vertically as shown in FIG. 4 from the sled 60 of the carriage, said sled 60 being developed essentially in the form of a plate which, on its rear side (see FIG. 4,) carries two sliding pieces 61 and 62 which enclose between them the lower lateral leg 63 of a U-shaped guide rail 64 and which, with its lower lateral leg 65, is rigidly attached to the frame 57 of the conveying carriage.

Figure 4:
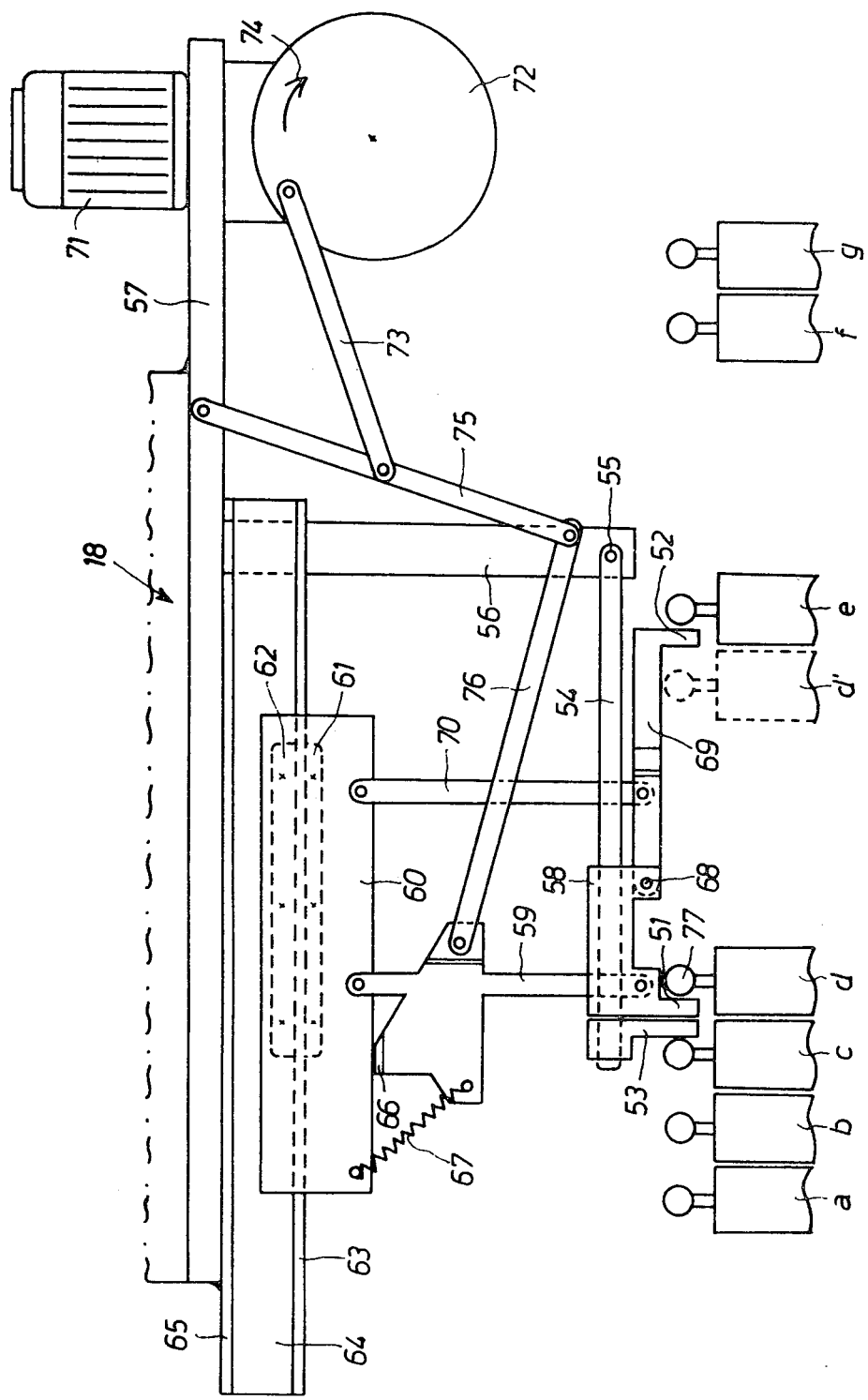
FIGS. 4, 5, 6 and 7 are the driving and control arrangements for the driver means and bolt disposed on the underside of the carriage for the driver means and the bolt in four successive position.

The side bar 59 carries, on its side adjacent the bolt 53, a stop 66 which, in the perpendicular position of the side bar 59 shown in FIG. 4, fits against the underside of the sled 60 and thus blocks any deviation of the upper end of the side bar 59 toward the right. A draw spring 67 is disposed between the side bar 59 and sled 60 and serves to load the side bar 59 in the direction toward the fit of its stop 66 against the sled 60.

Figure 5:
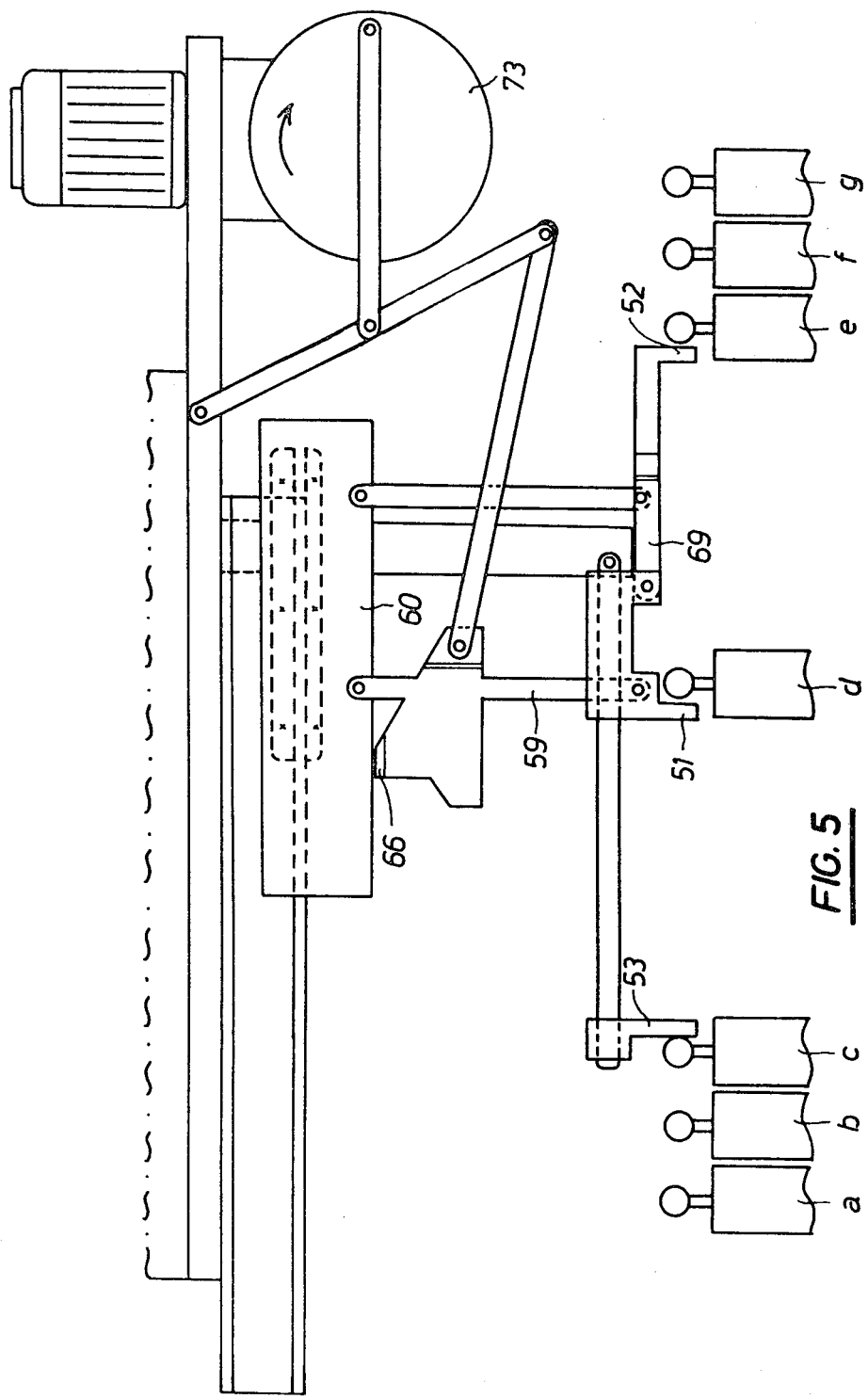

As shown in FIGS. 4 and 5, a horizontal latch lever 69, pointing forward, i.e., away from the bolt 53, is articulated at 68 to the end of the driver 51, facing away from the bolt 53, and the latch lever 69 is provided with a latch projection 52 which is directed downwardly. The latch lever 59, between its swivel bearing 69 and the projection 52, is articulated to and suspended from the sled 60 by way of a second side bar 70.

The drive and control of the driver 51, of the latch projection 52 and of the bolt 53 is accomplished by means of an electric motor 71, mounted on frame 57, which drives a crank disc 72 with connecting rod 73 in the direction of the arrow 74 as shown in FIG. 5. The connecting rod 73 engages the side bar 59 via a transmission linkage 75 and 76 (see FIG. 6), with the side bar resting approximately in the area of the longitudinal center as shown in FIG. 5. The transmission linkage consists of a lever 75 swivelably mounted on top of the frame 57, the lower end being articulated via a side bar 76 to the side bar 59. The connecting rod 73 is articulated to the longitudinal center of the lever 75 so that a transmission of 1:2 will result, e.g., a mechanical advantage of 2.

In FIG. 4, the bolt 53, driver 51 and latch projection 52 are in their lower engaging position in which they, therefore, lie in the path of movement of the upper driver bars 77 attached to the filter plates a to g. With an added rotation of the crank disc 72 into the position shown in FIG. 5, based on the forced drive caused by the stop 66, the side bar 59, the sled 60, the driver 51 and the latch lever 69 are shifted to the right. In this case the filter plate d is driven by the driver 51 by a first step into the position d', shown in a broken line in FIG. 4, while the latch projection 52 shifts the filter plate e on to the right up to the newly formed group of filter plates. The bolt 53, at the same time, holds back the filter plates a, b and c of the remaining pack of filter plates. With continued rotation of the crank disc 73 up to the position shown in FIG. 6, the transmission linkage 75 and 76, the sled 60, the driver 51 and the latch projection 52 are again pushed back into the position of FIG. 4 whereby the driver 51 strikes the bolt 53. Whenever the crank drive subsequently carries out its residual stroke up to the position of FIG. 7 the driver 51 is held firmly by the bolt 53 while the sled 60 is pushed out beyond the rear end position of the driver 51. In this case the side bar 59 is swivelled into a slanting position as a result of which the falling lever 54 is pushed up until the bolt 53 and the driver 51 are in the top non-engaging position. As a result of swinging the falling lever 54 up, and in connection with the second side bar 70 also having a slanting position, this side bar 59 is also lifted and swivelled upwardly until its projection 52 arrives in a non-engagement position. The motor 71 is controlled so that, with a crank position as shown in FIG. 7, it automatically turns off. In the position of FIG. 7 the driving motor 45 (FIG. 1) of the carriage 18 is switched on and the entire carriage is moved to the left by the width of a filter plate, after which the driving motor is switched off so that the carriage is again stopped at the guide girders 3 and 4. FIG. 7 shows this starting position. By means of an approximation switch (not shown) which is provided on the underside of the carriage and responds to a run-over of the filter plate-driver bar 77, the path of movement of the carriage may be limited precisely to the thickness of a filter plate.

Figure 6:
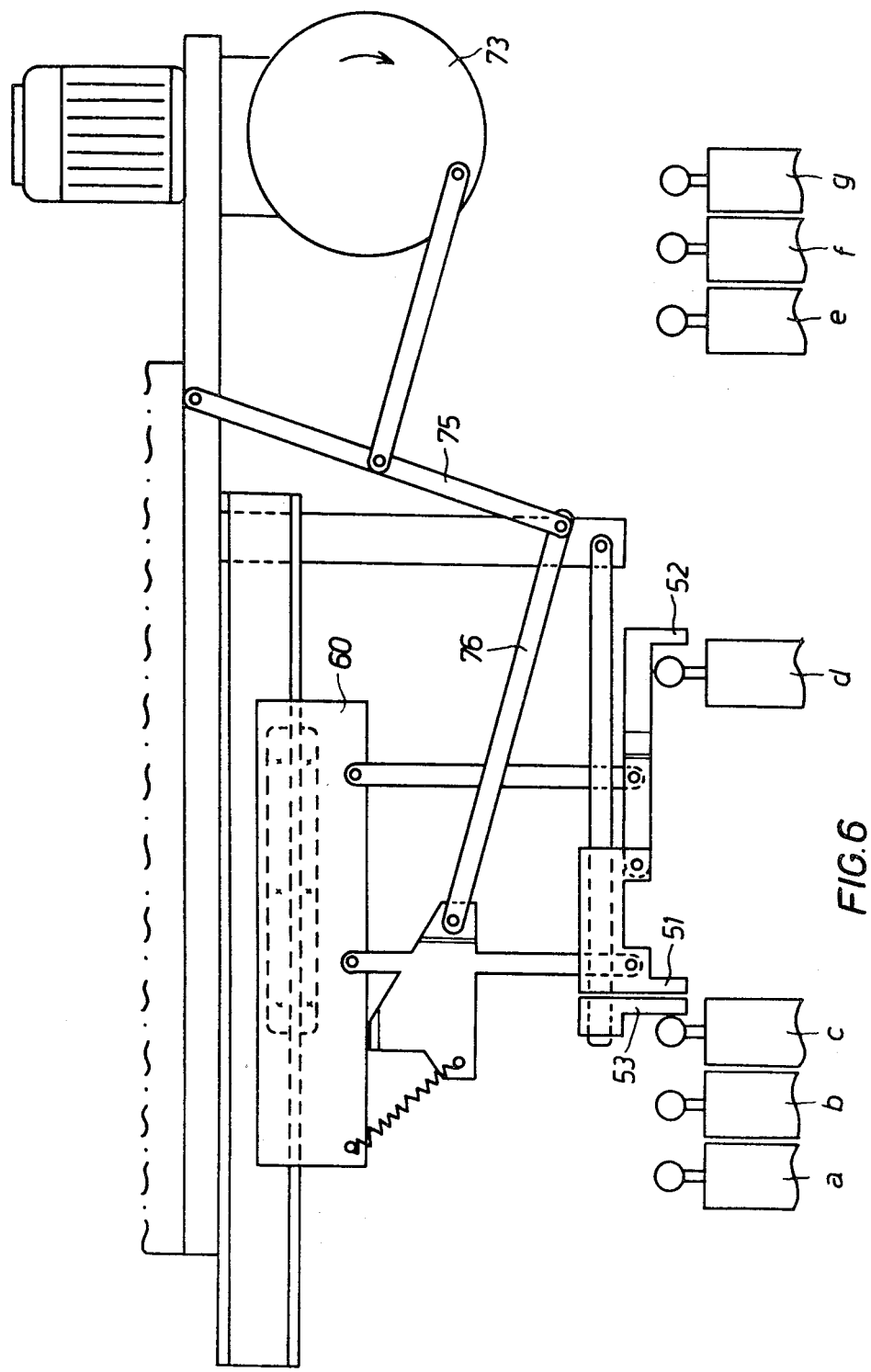
Figure 7:
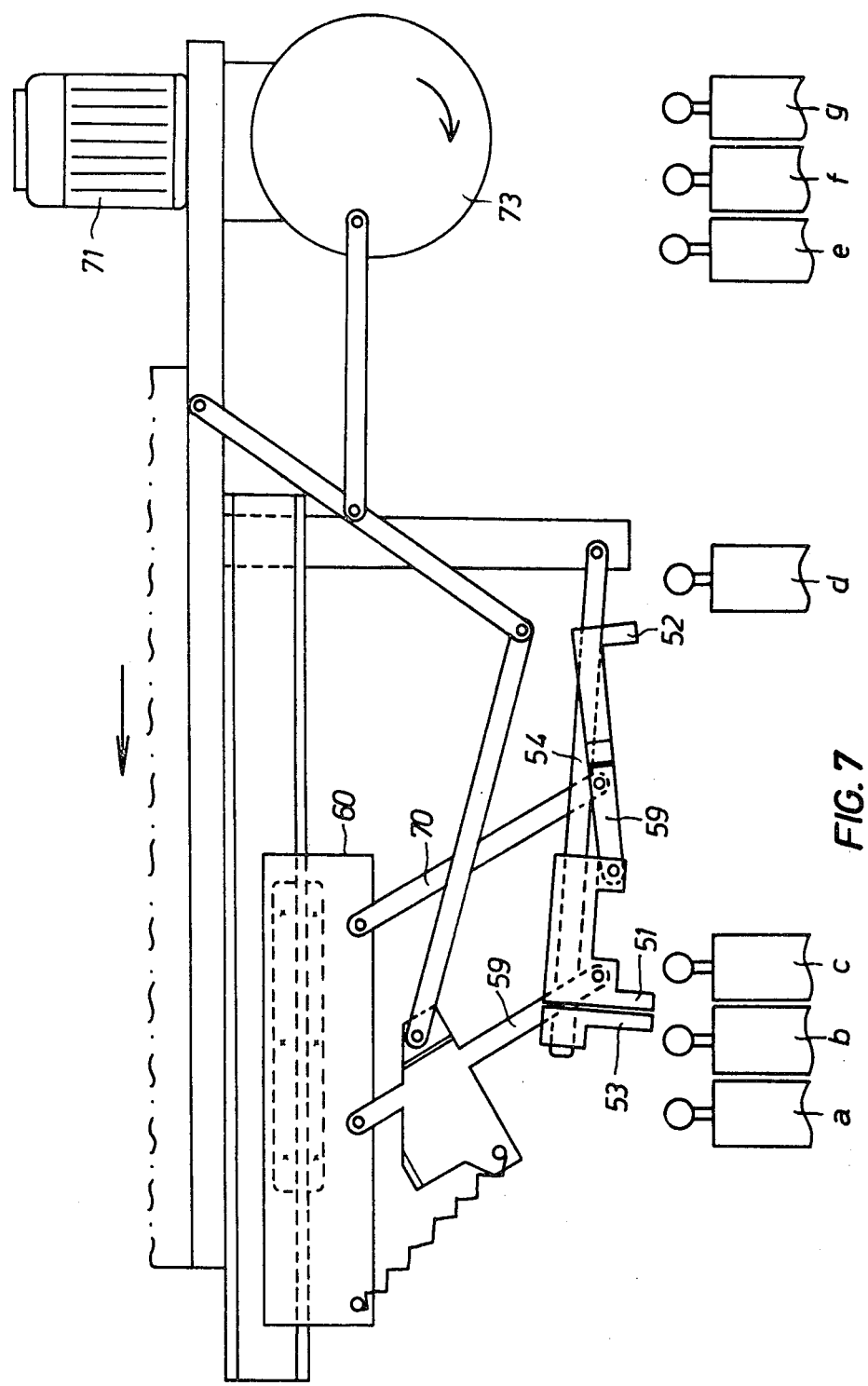

In the starting position as shown in FIG. 7 the motor 71 is switched on for a full rotation of the crank disc 73 for the transportation of plates, after which the control arrangement driven by it passes automatically through the operating positions as shown in FIGS. 4, 5 and 6 up to a renewed terminal or starting position as shown in FIG. 7 whereby the driver 51 pulls off one plate from the pack of filter plates while the latch projection passes on the previously pulled off filter plate.

The method of operation described requires the shifting path of the driver 51 on the falling lever 54 to be shorter by about the thickness of one filter plate than the distance between the operating flanks of the driver 51 and of the latch projection 52.

Whereas in FIGS. 4 through 7 only one driver 51 and one bolt 53 are shown, it is recommended, for a practical design, to provide two falling levers 54 side by side whereby each driver is suspended by means of one side bar 59 from a separate sled 60 in the manner shown. The crank drive shown may be used for both drivers 51 and bolts 53. The latch lever 69 of such modification is disposed between both falling levers 54 and is articulated to both drivers 51 via an axle at 68. In FIG. 2 a simplified sketch of the position of the two drivers 51 and 51' and bolts 53 and 53' and the one latch projection 52 of the modification described has been shown.

Instead of the crank drive described for the elements 51, 52 and 53 there may also be provided a hydraulic or pneumatic piston/cylinder arrangement.

Having thus disclosed, what we claim is:

1. In a movable apparatus for removal of filter plates from a pack of filter plates in a filter press resting on two horizontal guide girders provided with a carriage, a carriage frame and a sled movable on said girders, said apparatus having driving means, including a driver, for pulling off only the outside filter plate from the filter plate pack in an intermediate position on said girders in which the filter plate is accessible from both sides, the improvement comprising:
   a bolt for holding back the remaining filter plates in the pack;
   a latch projection for shifting a filter plate from the intermediate position to an end position on said girders;
   said driver, said bolt and said latch projection being movable up and down between a lower engagement position aligned with stops on the upper side of the filter plates and an upper non-engagement position;
   a reciprocating power driven element for said driver and said latch projection to couple said power driven element in such a way that, during propulsion movement of the reciprocation, the latch projection shifts said filter plate from the intermediate position on the girders to the end position on the girders while the driver shifts a new outside filter plate into the intermediate position; and
   stop means on the upper side of the filter plate arranged so that, during returning motion of the reciprocation, the latch projection is drawn back and is brought thereby into a lower engagement position behind the stop means on the upper side of the filter plate when the plate is in the intermediate position, said stop means operating to permit the driver and the bolt to come into a lower engagement position behind the stop means of the next adjacent outside filter plate of the filter plate pack.

2. Apparatus as claimed in claim 1, including a horizontal falling lever articulated to said carriage frame, wherein said bolt is rigidly attached to the free end of said horizontal falling lever;
   said driver and said latch projection being shiftable on said falling lever;
   a side bar attached to said carriage sled;

said driver being suspended by means of said side bar from said carriage sled whereby said driver is shiftable in a horizontal direction relative to said carriage frame and also shiftable in a forward direction by the driving means in the direction of the opening of the filter plate pack; and said driver drawing off only one plate by the forced driving of said driver when the carriage sled is shifted in a backward direction beyond the rear of the driver whereby the side bar on the remaining backward path of the sled lifts the falling lever, the bolt and the driver into the non-engagement position.

3. Apparatus as claimed in claim 2 wherein said side bar is provided with a side bar stop on its side opposite the direction of the pulling off of the filter plates which, with a vertical positioning of the side bar, fits said side bar stop against the underside of said sled.

4. Apparatus as claimed in claim 3 wherein said driving means comprises a crank drive which is articulated at the longitudinal center of the side bar by means of a transmission linkage.

5. Apparatus as claimed in claim 4 including a latch lever having a latch projection pointing forward towards the separated filter plate which is articulated to the driver, said latch lever having a horizontal arm which is articulated to the sled by means of a second side bar to provide a mechanical advantage in its lever action.

6. Apparatus as claimed in claim 5 wherein the falling lever and latch projection are so dimensioned that the shifting path of the driver on the falling lever is shorter by about the thickness of one filter plate than the distance between the driver and the latch projection.

* * * * *